United States Patent [19]

Fender

[11] Patent Number: 4,899,602
[45] Date of Patent: Feb. 13, 1990

[54] INDICATOR FOR MONITORING LINEAR ACTIVATOR POSITION

[75] Inventor: Norman Fender, Hudson, Mich.
[73] Assignee: Graco Robotics, Inc., Livonia, Mich.
[21] Appl. No.: 328,495
[22] Filed: Mar. 24, 1989
[51] Int. Cl.⁴ .................. G01M 19/00; G01B 5/00
[52] U.S. Cl. ......................... 73/865.9; 74/89.21
[58] Field of Search ............. 73/865.9; 74/89.21; 901/46, 47

[56] References Cited

U.S. PATENT DOCUMENTS

| | | | |
|---|---|---|---|
| 3,785,214 | 1/1974 | Ridley | 74/89.21 |
| 3,913,766 | 10/1975 | Wentz | 414/663 |
| 4,516,212 | 5/1985 | Nagashima | 364/474.26 X |
| 4,531,885 | 7/1985 | Molaug | 901/22 X |
| 4,688,985 | 8/1987 | Hartman | 74/89.21 X |
| 4,768,391 | 9/1988 | Hayes | 73/865.9 |
| 4,828,474 | 5/1989 | Ballantyne | 100/258 A |

Primary Examiner—Tom Noland
Attorney, Agent, or Firm—Paul L. Sjoquist

[57] ABSTRACT

The present invention relates to an indicator for monitoring the position of a piston rod of a linear actuator utilized in robotic mechanisms. The indicator includes a precision toothed chain which is pulled by an extending piston rod and drawn in by a coil spring to maintain tension in the chain and a non-slipping relation with a sprocket wheel driven by the chain. A shaft encoder mounted on a shaft of the sprocket wheel delivers digitized quantities representative of the degree of rotation of the shaft and sprocket wheel and of the linear position of an actuating, linearly-movable end of the piston rod.

5 Claims, 1 Drawing Sheet

INDICATOR FOR MONITORING LINEAR ACTIVATOR POSITION

BACKGROUND OF THE INVENTION

The present invention relates to indicators for monitoring the linear extension position of an actuator and, more particularly, to indicators for use in connection with robotic mechanisms.

A linear actuator such as a pneumatic or hydraulic cylinder converts air or hydraulic pressure into a linear force. Linear actuators have a wide variety of applications, one of which is in the field of robotics.

In a robotic application, linear actuators are typically utilized to move robotic mechanisms having multiple axes of motion. For instance, in a paint spray robot, six or more axes of freedom are manipulated in preprogrammed sequences to control, as the desired output, motion of a robot arm which sprays a coating of paint over a surface.

The actuating ends of the linear actuators are connected through linkages to various arms and levers, each of which is typically pivotal about a predetermined axis. It is desirable to monitor the precise position of the actuating end of each linear actuator in order to control the operation of the linkages, arms and levers and to coordinate the operation of each linear actuator with all other linear actuators.

The position of an actuating end of a linear actuator is typically measured by a shaft encoder or a rotating shaft resolver which provides a digital output as a function of the resolver shaft angular rotation position. The digitized quantity, which is purportedly representative of the position of the actuating end of a linear actuator, is delivered to a digital computer processor.

A problem with rotating shaft resolvers is that the position of the actuating or linearly movable end of the piston rod of an actuator is indirectly measured. A robotic mechanism includes a number of rotating gears which function in response to, but at a distance from, linear movement of a particular linear actuator. A rotating shaft resolver is typically connected to such a remote rotating gear and hence measures linear actuation in a circuitous and imprecise fashion.

SUMMARY OF THE INVENTION

An object of the present invention is to directly measure the position of the actuating linearly-movable end of a linear actuator.

Another object of the present invention is to measure with precision the position of the actuating linearly-movable end of a linear actuator.

Another object of the present invention is to instantly measure a change in position of the actuating, linearly-movable end of a linear actuator, as well as to ascertain the absolute position thereof.

A feature of the present invention is a precision toothed chain having an end attached to the actuating, linearly-movable end of a piston rod of a linear actuator. The chain extends from the actuating end to a cylinder housing where it is wrapped around a precision toothed sprocket wheel rotatably mounted on a shaft affixed to the relatively fixed cylinder housing. The chain extends from the sprocket wheel to another fixed portion of the cylinder housing to which an end of the chain is connected by a tension coil spring. The shaft of the sprocket wheel includes a rotating shaft resolver for providing a digital output of the position of the actuating end as translated by the precision toothed chain.

In operation, as the actuating, linearly-movable end of the actuator is linearly extended by hydraulic pressure from the stationary cylinder housing and pulls the precision toothed chain therewith, the chain rotates the sprocket wheel and expands the coil spring. As the linearly-movable end of the actuator is retracted, the coil spring draws in the precision toothed chain which in turn rotates the sprocket wheel. The respective angular rotation position of the shaft and sprocket wheel and hence the position of the actuating end of the linear actuator is translated by the rotating shaft resolver and communicated in digitized form to a digital computer processor.

An advantage of the present invention is that the position of a linear actuator is measured directly. Instead of measuring the position of a linear actuator from a gear structurally and functionally removed from the actuator, the extending and retracting end of a piston rod is affixed directly to an end of the precision toothed measuring chain.

Another advantage of the present invention is that the position of a linear actuator is measured precisely. Linear actuators are delicate instruments, capable of rotating robotic mechanisms less than one degree about an axis or extending a robotic arm less than a millimeter. Accordingly, the precision toothed chain provided by the present indicator responds to and measures such minute movement in exact, accurate and absolute terms.

Still another advantage of the present invention is that the position of the actuating, linearly-movable end of a linear actuator is measured continuously and that a change in the position thereof is measured almost instantaneously. The position of a linear actuator is conventionally measured by a shaft encoder mounted on a gear structurally and functionally remote from the linear actuator being measured; hence a period of time may elapse between the point at which a linear actuator begins to extend or retract its piston rod and the point at which a shaft encoder begins to respond to the change in position of the piston rod of the linear actuator. With the present indicator being affixed directly to the linearly movable end of a linear actuator, changes in the position of the actuating, linearly-movable end are relayed to a digital computer processor substantially instantaneously.

DETAILED DESCRIPTION OF THE PREFERRED EMBODIMENTS

Figure 1:
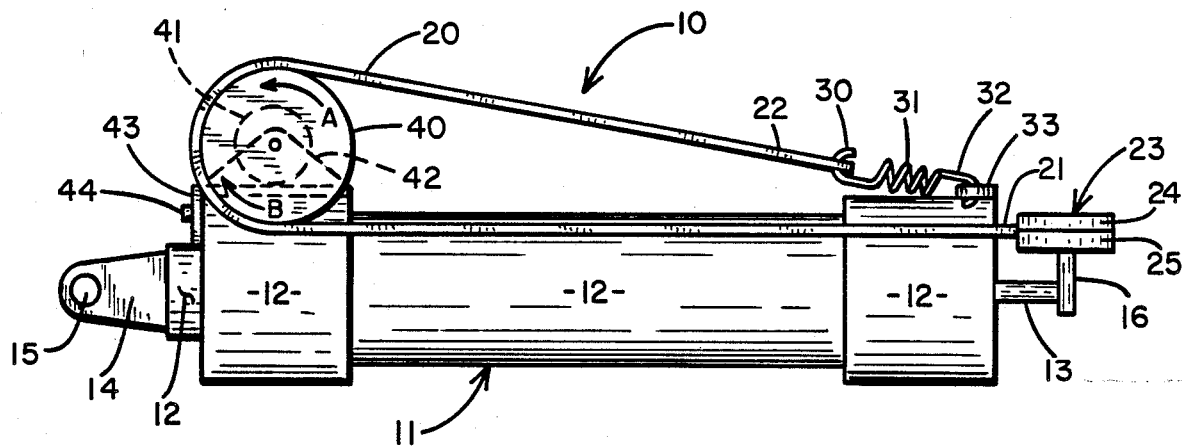
FIG. 1 is an elevational side view of an indicator connected to one type of linear actuator.

As shown in FIG. 1, an indicator 10 for monitoring linear actuator position is connected to a longitudinal linear actuator or hydraulic servo-cylinder 11 having a cylinder housing 12 and a linearly-movable piston rod 13. Cylinder housing 12 includes a connecting ear 14 with a bolt-receiving aperture 15 for mounting the servo-cylinder 11 within an apparatus such as a robotic mechanism. The piston rod 13 includes an actuating linearly-movable end 16. The actuating linearly-movable end 16 may be connected to any one of a number of arms, linkages or gears such as shown in the Moloug U.S. Pat. No. 4,531,885, issued July 30, 1985, which is hereby incorporated by reference.

The indicator 10 includes a precision toothed plastic-like measuring chain 20 having a first piston-connected end 21 and a second spring-connected end 22. The piston-connected end 21 is attached to a distal end of a laterally extending elongate bar 23 rigidly affixed to and extending laterally from the actuating linearly-movable end 16. The bar 23 may be formed from a pair of laterally extending elongate clamping members 24, 25. At least one of the members 24, 25 may be removable from the actuating end 16 so as to removably clamp chain end 21 between the clamping members 24, 25.

The second spring-connected end 22 of the precision toothed chain 20 is removably connected to a chain-connected, first hook end 30 of a tension coil spring 31. A housing-connected, second hook end 32 of the coil spring 31 is removably connected in an aperture (not shown) formed in a distal end of a laterally extending bar 33 rigidly affixed to and extending laterally from a piston rod-extending end of the cylinder housing 12. Bars 23 and 33 extend on the same side of the cylinder housing 12.

The precision toothed chain 20 is wrapped around a rotatable sprocket wheel 40 having a laterally extending rotatable shaft 41 rotatably mounted in a bearing 42 rigidly affixed to a bearing mount 43. The bearing mount 43 is rigidly and removably attached to a closed end of the cylinder housing 12 by a bolt 44. The sprocket wheel 40 is mounted on a distal end of the shaft 41. The shaft 41 extends on the same side of the cylinder housing 12 as bars 23 and 33. A shaft encoder or rotating shaft resolver (FIG. 3) is mounted on the shaft 41 for providing a digital output corresponding to the angular rotation position of the shaft 41 and sprocket wheel 40.

It should be noted that the indicator 10 is mounted on the linear actuator 11 to continuously maintain a slight tension in the chain or belt 20 and in the tension spring 31. Even when the piston rod 13 is in its fully retracted position, slack is substantially absent in the chain 21 and spring 31 so that each tooth of the precision toothed chain 20 cooperates with only one respective sprocket of the sprocket wheel 40. A bight of approximately 180° is formed between the chain 20 and the sprocket wheel 40.

It should further be noted that the precision tooth chain 20, the sprocket wheel 40, and the coil spring 31 lie in substantially the same plane. Such a planar arrangement, coupled with the piston rod 13 and actuating end 16 being extended and retracted in a linear fashion, precludes the chain 21 from being twisted or bent so as to misalign the chain 20 with the sprocket wheel 40.

Figure 2:
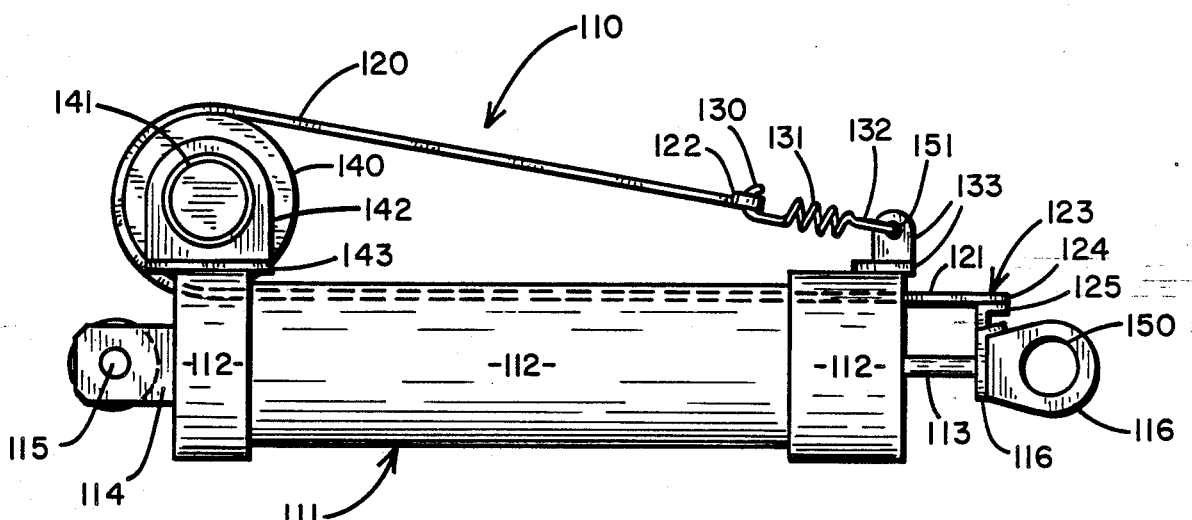
FIG. 2 is an elevational side partially phantom view of an indicator connected to a type of linear actuator different from the type of linear actuator shown in FIG. 1.
Figure 3:
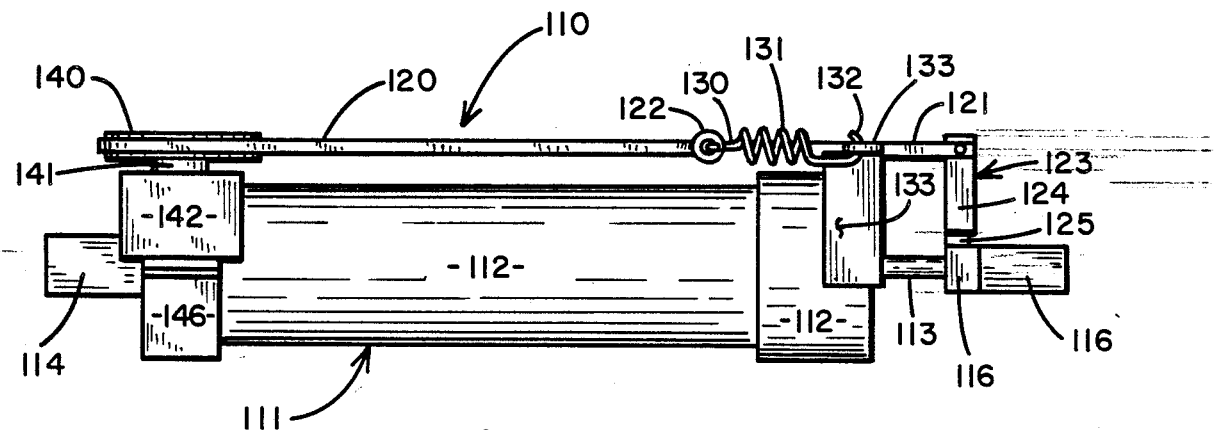
FIG. 3 is a top view of the indicator and actuator shown in FIG. 2.

An indicator 110 for monitoring linear actuator position shown in FIGS. 2 and 3 is substantially similar in structure and function as the indicator 10 shown in FIG. 1. The indicator 110 includes a precision toothed plastic-like measuring chain 120, a first piston-connected end 121, a second spring connected end 122, a laterally extending elongate bar 123 having a pair of laterally extending elongate clamping members 124, 125, a tension coil spring 131 with a chain-connected first hook end 130 and a housing-connected second hook end 132, a laterally extending bar 133, a rotatable sprocket wheel 140, a laterally extending shaft 141, a bearing 142, a bearing mount 143, and a shaft encoder 146.

A linear actuator 111 shown in FIGS. 2 and 3 is substantially similar in structure and function as the linear actuator 11 shown in FIG. 1. The linear actuator 111 includes a cylinder housing 112, a linearly-movable piston rod 113, a connecting ear 114 with a bolt-receiving aperture 115, and a ring like actuating linearly-movable end 116.

It should be noted that the linearly-movable end 116 is ring-like and forms an aperture 160; that the laterally extending elongate clamping member 125 is an angle iron-like member; that laterally extending bar 13 is an angle iron-like member having an aperture 151 receiving the second hook end 132; and that bearing mount 143 is rigidly connected, such as by welding, to cylinder housing 112.

In operation, the linear actuator 11 such as in a robotic mechanism may receive a volume flow of pressurized fluid through parts (not shown) and external valves (not shown). The valves are typically operated in response to signals which originate as a digitized quantity from a digital computer processor of the robotic mechanism. In response to the digitized quantity, the linear actuator 11 may extend the piston rod 13 having the actuating, linearly-movable end 16. The linearly-movable end 16 subsequently moves an arm, link, or lever, in conjunction with other linear actuators and arms, links and levers, to produce a desired robotic output.

As the linear actuator 11 extends its linearly-movable end 16, the end 16 pulls the chain end 21 of the precision toothed chain 20. Simultaneously, the precision cut teeth of the chain 20 interact with the sprockets of the sprocket wheel 40 in a non-slippage relation to cause the wheel 40 to rotate in a counterclockwise direction of arrow A as shown in FIG. 1. As the sprocket wheel 40 rotates and the shaft 41 rotates in bearing 42, the shaft encoder delivers a digitized quantity to the digital computer processor representative of the angular rotation position of shaft 41 and sprocket wheel 40 and hence of the position of the linear actuator 11 and the actuating, linearly-movable end 16. At the same time as the first chain end 21 is pulled by the extending, linearly-movable end 16 and the clamping bar 23, the second spring-connected chain end 22 expands the tension coil spring 31.

Subsequently, after the linearly-movable end 16 has been extended, the linear actuator 11 continues to receive drive signals from the robotic mechanism's digital computer processor. The indicator 10 also continues to deliver digitized quantities to the digital computer processor whether or not the position of the piston rod 13 and linearly-movable end 16 is being extended, has been extended, is remaining extended, is being retracted, or is remaining in a retracted position.

As soon as the linear actuator 11 begins to retract linearly-movable end 16 from an extended position, the coil, tension spring 31 draws in chain end 22, which simultaneously causes sprocket wheel 40 and shaft 41 to rotate in the clockwise direction of arrow B. As the sprocket wheel 40 and shaft 41 rotate, the shaft encoder delivers digitized quantities to the robotic mechanism's digital computer processor representative of the angular rotation position of the shaft 41 and thus of the position of the actuating, linearly-movable end 16.

What is claimed is:

1. An indicator for monitoring the position of a linear actuator having a relatively stationary cylinder housing and a piston rod with an actuating, linearly-movable end, comprising:
  (a) a rotatable shaft in a housing, said housing affixed to said stationary cylinder housing with said rotatable shaft positioned transverse to the direction of movement of said linearly-movable end;
  (b) a toothed sprocket mounted to said shaft;
  (c) a rotatable means coupled to said rotatable shaft, for generating signals representative of the position of said rotatable shaft;
  (d) a toothed chain having a first end affixed to said linearly-movable end, and engaged about said toothed sprocket, and having a second end; and
  (e) tension spring means for applying extensible tension to said toothed chain, said tension spring means having a first end connected to said cylinder housing and a second end connected to said toothed chain second end.

2. The apparatus of claim 1, wherein the rotatable shaft housing is affixed to said stationary cylinder housing at a point remote from said linearly-movable end.

3. The apparatus of claim 2, wherein said tension spring means further comprises a coil spring.

4. The apparatus of claim 3, wherein said toothed chain is engaged about said toothed sprocket over a bight of approximately 180°.

5. The apparatus of claim 4, wherein said toothed chain is aligned substantially parallel with said piston rod.

* * * * *